(No Model.)

A. GEISEL.
OVEN FOR GASOLINE, GAS, OR COAL OIL STOVES.

No. 385,348. Patented July 3, 1888.

Attest
Wm. M. Eccles.
Oliver Roedler

Inventor:
Andrew Geisel

UNITED STATES PATENT OFFICE.

ANDREW GEISEL, OF ST. LOUIS, MISSOURI.

OVEN FOR GASOLINE, GAS, OR COAL-OIL STOVES.

SPECIFICATION forming part of Letters Patent No. 385,348, dated July 3, 1888.

Application filed November 14, 1887. Serial No. 255,170. (No model.)

*To all whom it may concern:*

Be it known that I, ANDREW GEISEL, a citizen of the United States, residing in the city of St. Louis, in the State of Missouri, have invented a new and useful Oven for Gasoline, Gas, or Coal-Oil Stoves, of which the following is a specification.

My invention consists in the combination and arrangement of parts as hereinafter described and claimed.

Figure 1:
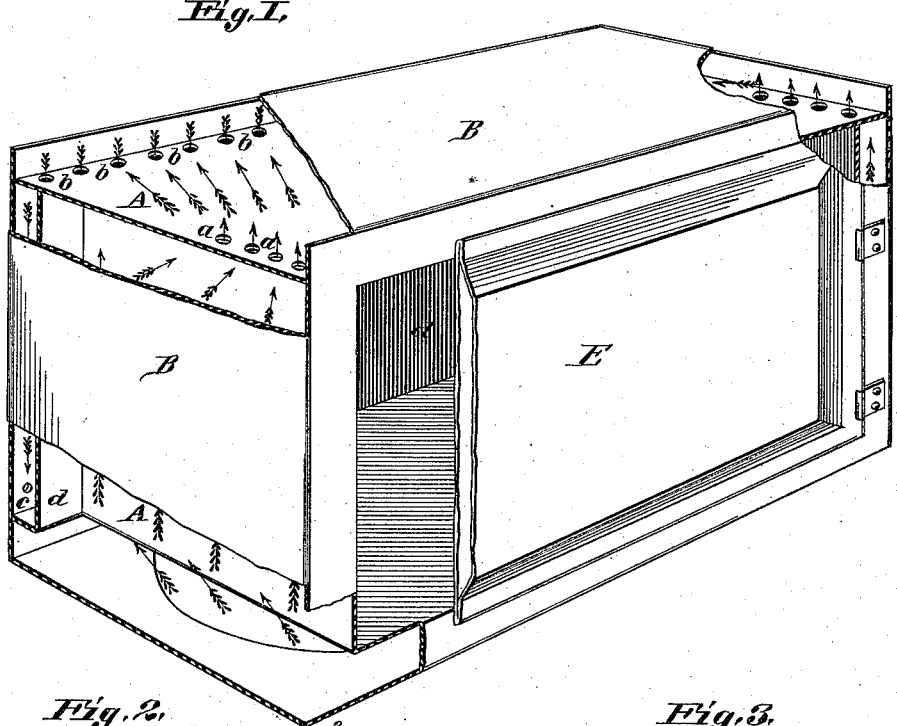
Figure 2:
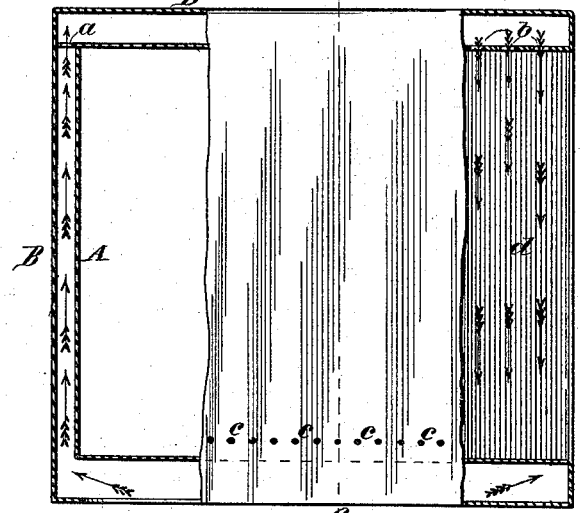
Figure 3:
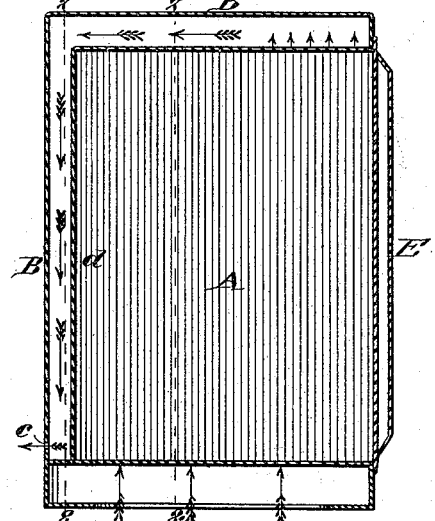

Figure 1 is a perspective view of my oven, with a part of the door cut away to show the interior of the oven, and the outside casing cut away at each end to show the aperture or passage-way for the heat between the inner casing and the outside casing, and also to show the holes in the upper or partition plate for the passage of the heat through the oven aperture or passage-way. Fig. 2 is a back view of the oven with the right-hand end of the figure a longitudinal section drawn on the line 2 2 in Fig. 3 and the left-hand end of the figure drawn on the line 2' 2' in Fig. 3. Fig. 3 is a transverse section of the oven drawn on the line 3 3, Fig. 2.

Similar letters refer to similar parts throughout the several drawings or views.

Letter A is the inside casing of the oven, and is made of any ordinary metal suitable for the purpose, and is provided at the top with a partition-plate which extends at each end and back of the oven and connects permanently with the end and back plates of the outside casing, B. This plate is provided at each end near the front of the oven with apertures *a a a*, which communicate with the end passage-ways. This plate is also provided at its back edge with a row of holes, *b b b b*, which communicate with the back passage-way and allow the heat to pass through them and down the back passage-way to the row of holes *c c c c*, which are situated in the outside casing at the back and bottom of the oven. The back plate of the inside casing (designated in the drawings by the letter *d*) extends at each end and is permanently and tightly fastened to the inside of the end plates in the outside casing. The front plate of the inside casing extends at the top, bottom, and ends and unites with the respective plates of the outside casing and is provided with a door, E. The bottom plate of the inside casing extends and unites with the outside casing at the rear of the oven, so as to cut off all communication of the back aperture with the bottom aperture, or with the end passage-ways. The latter is accomplished by having the end extend the width of the back aperture or passage-way to and communicate with the end plates of the outside casing. The bottom plate of the outside casing is cut away at the bottom to make a passage-way for the flame and heat from the burner or burners to be used. Thus by these two casings there is an oven formed with a passage-way at each end for the passage of heat and flame up the ends of the oven after having been collected in the lower aperture, and through the holes at the front and top of the oven into the top passage-way or aperture, and a top passage-way and a back passage-way.

The holes *a a a* are placed in the upper plate near the front to draw the heat to the front before passing into the upper aperture, so that it will be compelled to pass over the whole top of the oven. Care must be taken not to make these holes too large or too numerous, so as to allow the heat to pass through too rapidly, the object of the holes being to retard the too rapid passage of the heat, and thus save it and supply the oven with an even temperature by distributing the heat over five sides of the oven—two ends and three sides. The holes at the back of the upper plate are arranged in a row the whole length of the oven, which operates to distribute the heat all over the back of the oven as it passes down the back passage-way. The exit-holes arranged in a row along the whole length of the back is to permit the heat to escape all along the whole length of the oven, so that in its passage it will continue to remain distributed equally over the surface of the oven until it escapes from the last aperture.

I know there have been ovens which had the heat passed around them in one belt; but never has there been constructed an oven with a system of holes and apertures and passage-ways for heat which are formed by an outside and inside casing, and which operate to distribute the heat equally on all sides of the oven but the front, as mine does, and which have a uniform and even temperature on the top, bottom, sides, and end of the oven, as mine does, thus producing an oven that will bake or cook more evenly and perfectly than any other oven yet produced, by reason of the equal and uniform distribution of the heat over all of its sides.

The arrows show the direction of heat in its passage around the oven.

Now, what I claim, and for which I ask Letters Patent to be granted to me, is—

An oven for gasoline, gas, or coal-oil stoves, composed of an outside and an inside shell having a space between the shells, the outside shell being provided with an opening or openings at the back near the bottom for the escape of the heat, said shells being united together at both ends at the top and back, and at the back near the bottom by partitions, the partitions uniting the shells at the top being provided with holes or a slot near the front of the inside shell, substantially as described.

ANDREW GEISEL.

Attest:
WM. M. ECCLES,
WALTER C. CARR.